United States Patent
Su et al.

(10) Patent No.: US 9,321,889 B1
(45) Date of Patent: Apr. 26, 2016

(54) COPOLYMER OF DCPD-CONTAINING BENZOXAZINE (DCPDBZ) AND CYANATE ESTER RESIN, AND METHOD OF MANUFACTURING THE COPOLYMER

(71) Applicant: NATIONAL CHUNG SHAN INSTITUTE OF SCIENCE AND TECHNOLOGY, Longtan Township (TW)

(72) Inventors: Wen-Chiung Su, Taipei (TW); Ching-Hsuan Lin, Taichung (TW); Sheng-Chen Liao, Toufen Township (TW); Yu-Wei Chou, Taichung (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 0 days.

(21) Appl. No.: 14/546,481

(22) Filed: Nov. 18, 2014

(51) Int. Cl.
  *C08G 65/38* (2006.01)
  *C08G 73/06* (2006.01)
  *C08G 65/40* (2006.01)

(52) U.S. Cl.
  CPC .................. *C08G 73/0644* (2013.01)

(58) Field of Classification Search
  CPC ........................... C08G 73/22; C08G 73/0266
  USPC ........................................................ 528/210
  See application file for complete search history.

(56) References Cited

U.S. PATENT DOCUMENTS

2014/0004324 A1* 1/2014 Hsieh .................... C08L 71/123
  428/209

OTHER PUBLICATIONS

Suzuki, Y.; Higashihara, T.; Ando, S.; Ueda, M. Macromolecules 2012, 45, 3402-3408—Synthesis and Characterization of High Refractive Index and High Abbe's Number Poly(thioether sulfone)s based on Tricyclo [5.2.1.02,6] decane Moiety.
Hwang, H. J.; Lin, C. Y.;Wang, C. S. J. Appl. Polym. Sci 2008, 110, 2413-2423—Flame Retardancy and Dielectric Properties of Dicyclopentadiene-Based Benzoxazine Cured with a Phosphorus-Containing Phenolic Resin.
Fang, T.; Shimp, D. A. Prog. Polym. Sci. 1995, 20, 61-118—Polycyanate Esters: Science and Applications.
Shieh, J. Y.; Yang, S. P.;Wu, M. F.; Wang, C. S. J Polym Sci Part A: Polym Chem 2004, 42, 2589-2600—Synthesis and Characterization of Novel Low-Dielectric Cyanate Esters.

* cited by examiner

*Primary Examiner* — Terressa Boykin
(74) *Attorney, Agent, or Firm* — Schmeiser, Olsen & Watts, LLP

(57) ABSTRACT

A copolymer of DCPD-containing benzoxazine (DCPDBz) and cyanate ester resin forms a low-dielectric thermosetting polymeric material for making electronic components. A method of manufacturing the copolymer is also introduced. The method includes allowing DCPD-phenol oligomer, aniline, and paraformaldehyde to react at 110° C. for 6-12 hours before being extracted and baked to obtain DCPDBz; and mixing cyanate ester and the DCPDBz at 150° C.; heating the mixture up to 220° C.

7 Claims, 7 Drawing Sheets

COPOLYMER OF DCPD-CONTAINING BENZOXAZINE (DCPDBZ) AND CYANATE ESTER RESIN, AND METHOD OF MANUFACTURING THE COPOLYMER

FIELD OF TECHNOLOGY

The present invention relates to materials of a low dielectric constant and methods of manufacturing the materials, and more particularly, to a copolymer produced by a reaction between DCPD-containing benzoxazine (DCPDBz) and cyanate ester resin and suitable for use in material for making electronic components.

BACKGROUND

According to the prior art, when integrated circuit components are downsized to achieve a maximum of 0.25µ in the least metal-metal pitch attained by multilayer metal conducting wire manufacturing process technology, the time delay caused by interconnect becomes a major factor in component operation speed, unit area capacity, reliability, and yield. The time delay caused by interconnect equals the product of the resistance of the metal conducting wires and the capacitance of the dielectric layer between the metal conducting wires. Hence, to reduce the time delay caused by interconnect, it is practicable to use a metal of a low resistance or use a material of a low dielectric constant to make the dielectric layer between a metal and another metal.

The silicon dioxide for use in a conventional manufacturing process has a dielectric constant of 3.9 and thus meets the related requirements of a 0.35µ manufacturing process. However, a less-than-0.35µ manufacturing process requires a dielectric layer material of a much lower dielectric constant. Since organic polymeric dielectric materials seldom have a lower dielectric constant than inorganic silicon dioxide and silicon nitride do, organic polymeric dielectric materials are more suitable for use in making metal dielectric layers between multilayer interconnects than inorganic dielectric materials are. In view of this, the present invention provides a novel low dielectric constant material and its manufacturing method.

Dicyclopentadiene (DCPD) is produced when cyclopentadiene undergoes Diels-Alder reaction and thus has an aliphatic structure, high hydrophobicity, and a low dielectric constant materials. A lot of academics and manufacturers introduce DCPD into electronic materials to reduce the dielectric constants thereof. For instance, when catalyzed by aluminum trichloride, it is feasible for DCPD to react with phenol to produce DCPD-phenol oligomer whose structure is depicted as follows:

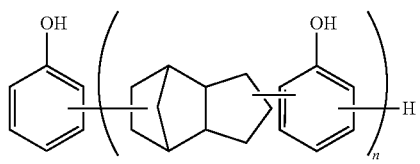

A wide variety of resins are derived from the phenolic group of the oligomer. In this regard, DIC epoxy resin (HP-7200) is typical of cyanate ester (XU-7187) of Dow-Chemical.

Ueda, an academic, discloses that the double bonds of DCPD undergo a free radical addition reaction with thiol to produce a monomer which carries a functional group, and then synthesize a sulfur-containing material suitable for use in thermoplastic injection molding, wherein the sulfur-containing material exhibits high permeability, high Abbe number, high transmittance, and high glass transition temperature (Suzuki, Y; Higashihara, T.; Ando, S.; Ueda, M. Macromolecules 2012, 45, 3402-3408.)

Wang discloses that a DCPD-phenol oligomer reacts with a phenolic group to produce a benzoxazine resin as compared to BPA-based benzoxazine and a biphenol-based benzoxazine resin. The result shows that the DCPD-based benzoxazine manifests a low dielectric constant and low hygroscopicity and thus is an advantageous material suitable for use in manufacturing advanced printed circuit boards (Hwang, H. J.; Lin, C. Y; Wang, C. S. J. Appl. Polym. Sci 2008, 110, 2413-2423.)

Cyanate ester polymers are well regarded by the electronic sector as high-performance thermosetting resins which display a high glass transition temperature, high thermal stability, low hygroscopicity, and a low dielectric constant when fully cured. The prior art disclosed a lot of novel cyanate esters which contain silicon, trifluoromethyl, phosphorus, and dipentene. Fang discloses introducing various groups into cyanate ester resins to endow them with specific functions which, together with the satisfactory thermal properties of the cyanate esters, attain high thermal stability and high performance (Fang, T.; Shimp, D. A. Prog. Polym. Sci. 1995, 20, 61-118).

In practice, Mitsubishi Gas Chemical Co., Inc. developed a line of copolymer products known as BT-resins and produced from cyanate ester (T: triazine) and bismaleimide (B: bismaleimide). BT-resins share come advantages with polyimide, that is, tolerant to heat, easy to process epoxy resins, and compatible with the other thermosetting resins, such as epoxy resins. However, the market for BT-resins is monopolized by Mitsubishi Gas Chemical Co., Inc. Hence, it is advantageous to develop novel materials with a low dielectric constant in order to circumvent related patents owned by American and Japanese manufacturing giants.

Shackled by a low curing speed and a three-dimensional reticular structure in a late curing stage, cyanate esters manifest high viscosity and thus retention of highly polar terminal group cyanate ester (—OCN), thereby leading to an increase in their dielectric constant. As early as the time when aromatic cyanate esters were developed, academics discovered that cyanate ester (—OCN) reacts with phenol (Ph—OH) to produce imidocarbonate (—OC=NO—). In view of this, Wang discloses reducing the retention of OCN terminal groups by bisphenol-A dicyanate (BADCY) during a polymerization process. Results of experiments conducted by Wang reveal that the reduction of highly polar —OCN terminal groups is effective in reducing the hygroscopicity and dielectric constant, albeit at the cost of some advantages of cyanate esters, including high glass transition temperature and tolerance to high temperature (Shieh, J.Y; Yang, S. P.; Wu, M. F.; Wang, C. S. J Polym Sci Part A: Polym Chem 2004, 42, 2589-2600.)

SUMMARY

In view of the aforesaid drawbacks of the prior art, it is an objective of the present invention to provide a novel compound structure, and the structure results from copolymerization of DCPD-containing benzoxazine (DCPDBz) and cyanate ester, so as to form a novel thermosetting polymer structure expressed by chemical formula (I) as follows:

(I)

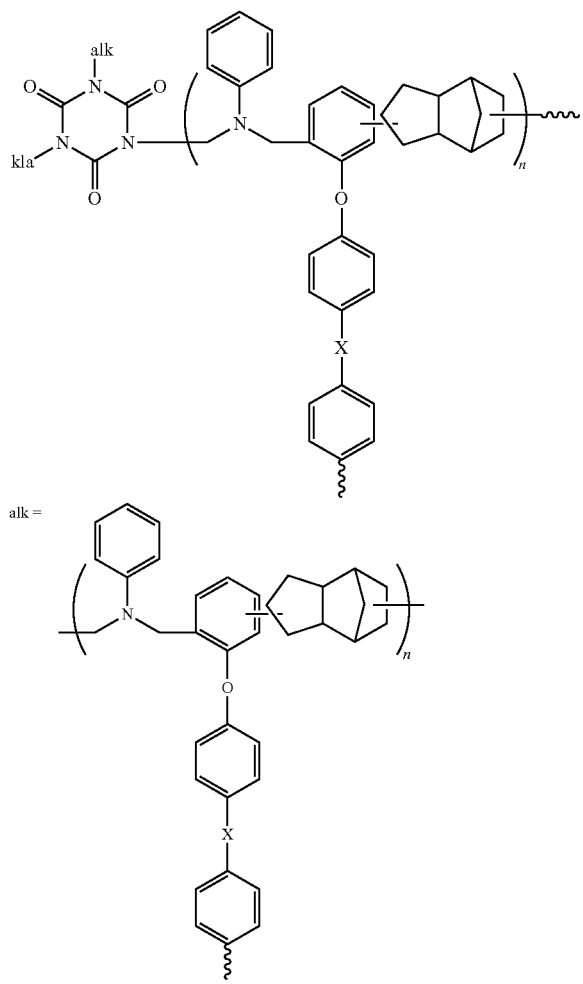

wherein n denotes an integer, with 1≤n≤30, and X denotes at least one of —O—, —SO$_2$—, —CH$_2$—, —C(CH$_3$)$_2$—, and —C(CF$_3$)$_2$—.

Another objective of the present invention is to provide a method of manufacturing a copolymer of DCPD-containing benzoxazine (DCPDBz) and cyanate ester resin. The method comprises the steps of: providing DCPD-phenol oligomer, aniline, and paraformaldehyde in a first solvent to form a first solution, allowing the first solution to undergo a reaction at 110° C. for 6-12 hours, extracting and baking the first solution, precipitating and rinsing a product with a second solvent, drying the precipitated rinsed product in a vacuum oven to obtain DCPDBz, mixing a cyanate ester and the DCPDBz at 150° C., and heating the mixture up to 220° C. to produce the copolymer of the thermosetting polymeric DCPDBz and cyanate ester resin.

The oligomer of the present invention refers to any polymer with a relative molecular mass less than that of polymers but larger than that of small molecules. For example, the repeat unit of the present invention has a relative molecular mass of 10-30.

In an embodiment of the present invention, the first solvent is toluene, and the second solvent is hexane.

In an embodiment of the present invention, the mole equivalent ratio of oligomer, aniline, and paraformaldehyde of DCPD-phenol is 1:1:2.

In an embodiment of the present invention, the cyanate ester resin has a structure as follows:

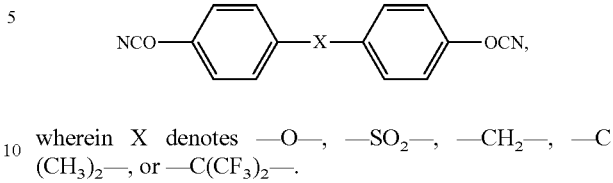

wherein X denotes —O—, —SO$_2$—, —CH$_2$—, —C(CH$_3$)$_2$—, or —C(CF$_3$)$_2$—.

BRIEF DESCRIPTION

DETAILED DESCRIPTION

The implementation of the present invention is hereunder illustrated with specific embodiments, so that persons skilled in the art can gain insight into the other advantages and effects of the present invention easily.

Embodiment 1

Figure 1:
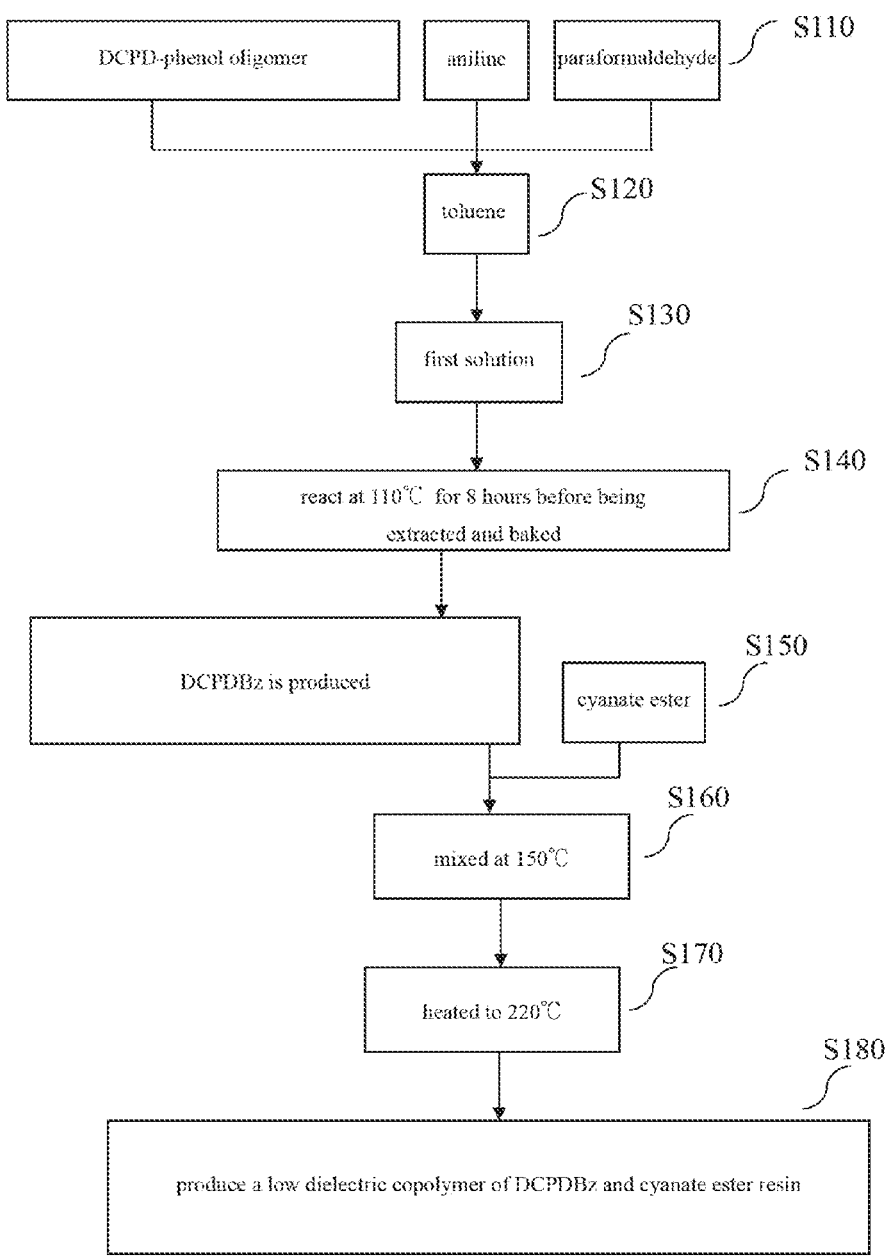
FIG. 1 is a flow chart of a method of manufacturing a copolymer of DCPD-containing benzoxazine (DCPDBz) and cyanate ester resin according to an embodiment of the present invention.
Figure 2:
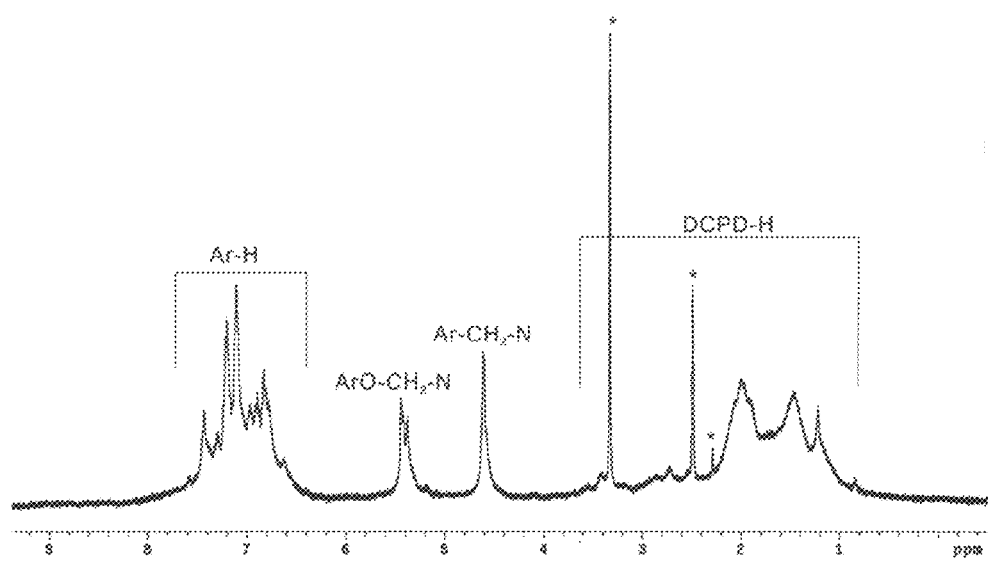
FIG. 2 is a 1H NMR spectrum of DCPDBz according to an embodiment of the present invention.

Referring to FIG. 1, there is shown a flow chart of a method of manufacturing a copolymer of DCPD-containing benzoxazine (DCPDBz) and cyanate ester resin according to an embodiment of the present invention. As shown in the diagram, the process flow of the method is as follows: 10.0 g of DCPD-phenol oligomer (0.5 mole equivalent), 4.656 g of aniline (0.5 mole), and 3.0 g of paraformaldehyde (1.0 mole) are provided (S110) and then introduced to 200 mL of toluene (S120) to form a first solution (S130), and then the first solution undergoes a reaction at 110° C. and for 8 hours before being extracted and baked (S140). The extraction is carried out thrice each with 1M sodium hydroxide (NaOH) and deionized water. The extract undergoes precipitation and rinsing carried out with hexane before being put in a vacuum oven to undergoing a baking process, and in consequence the DCPDBz produced has a yield of 70% or so. The reaction pathway is expressed with Formula 1, and its product analysis is depicted with FIG. 2 which is 1H NMR spectrum of the DCPDBz. The process flow of the method continues as follows: DCPDBz and cyanate ester are provided (S150), mixed at 150° C. (S160), and heated at three temperatures, namely 180° C., 200° C., and 220° C., successively, each for 2 hours (S170), to produce a low dielectric copolymer of DCPDBz and cyanate ester resin (S180).

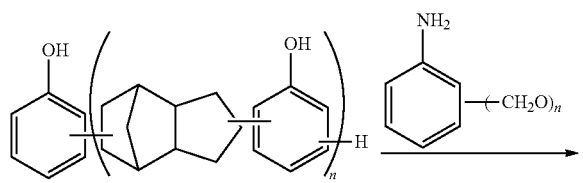

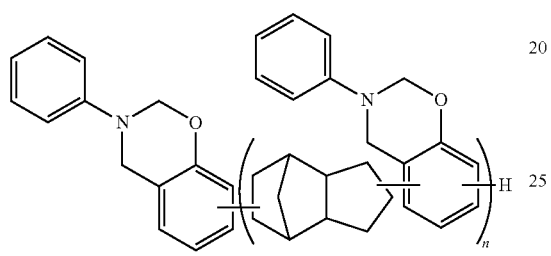

Formula 1: Method of Producing DCPDBz wherein the cyanate ester resin is one selected from a cyanate ester of the structure as follows:

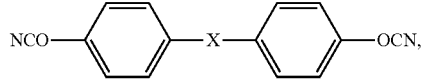

X denotes —O—, —SO2-, —CH2-, —C(CH3)2- or —C(CF3)2-. The thermosetting polymeric low dielectric copolymer material thus produced is expressed by chemical formula (I)

(I)

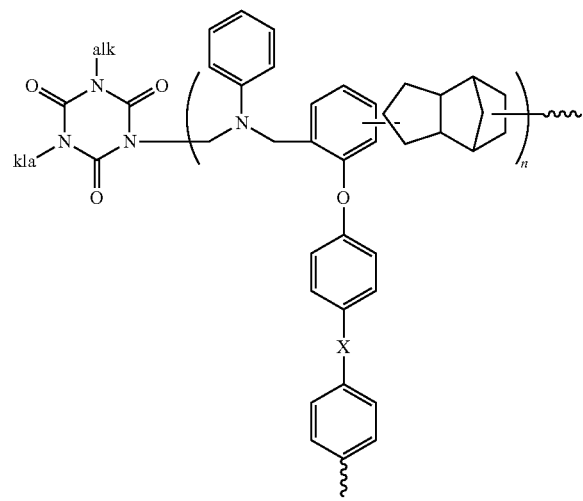

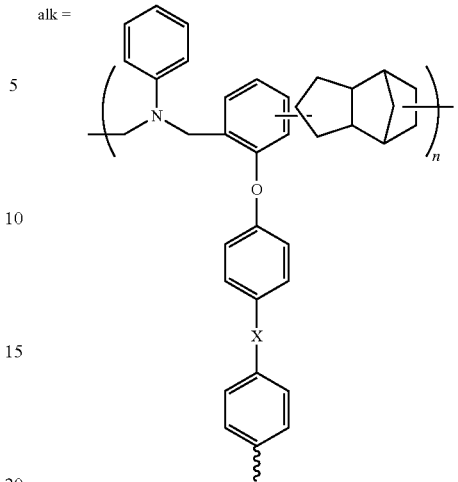

wherein n denotes an integer, with 1≤n≤30, and X denotes —O—, —SO2-, —CH2-, —C(CH3)2- or —C(CF3)2-.

Embodiment 2

The molecular formulas of DCPDBz oligomer and bisphenol-A dicyanate (BADCY) are as follows:

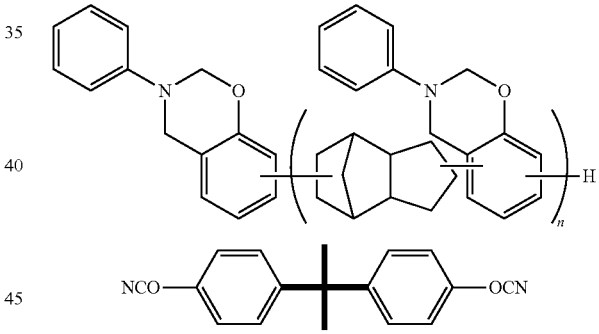

wherein the n of DCPDBz denotes an integer, with 1≤n≤30

In this embodiment, the DCPDBz and BADCY are mixed in different proportions shown in Table 1 below.

TABLE 1

| proportions in which DCPDBz and BADCY are mixed | | |
|---|---|---|
| | DCPDBz | BADCY |
| 1 | 100 | 0 |
| 2 | 25 | 75 |
| 3 | 50 | 50 |
| 4 | 75 | 25 |
| 5 | 0 | 100 |

Figure 3:
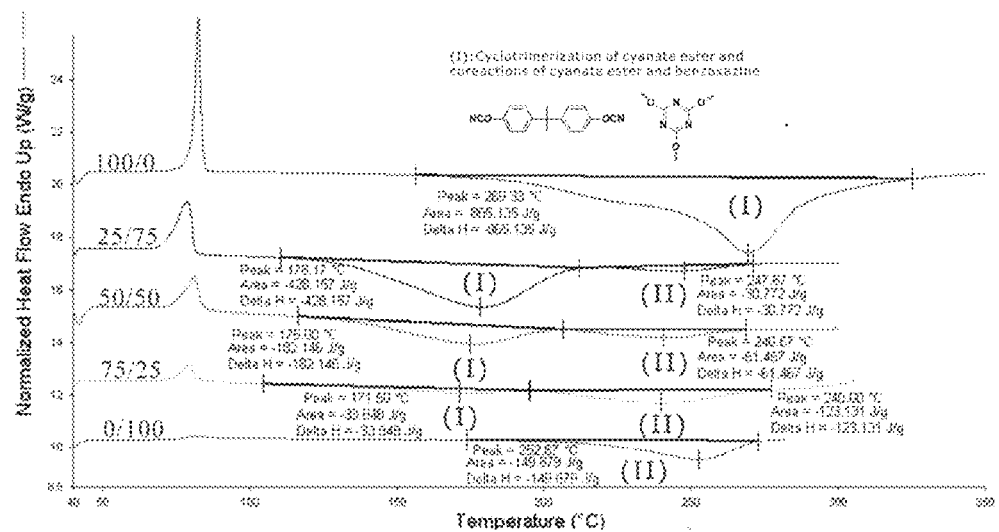
FIG. 3 are graphs of DSC of BADCY/DCPDBz dopants in different proportions according to an embodiment of the present invention.

The dopants of DCPDBz and BADCY are measured with differential scanning calorimeter (DSC), Fourier transform infrared spectroscopy (FT-IR), and dynamic mechanical analyzer (DMA), before and after mixing, and in different proportions. Referring to FIG. 3, there are shown graphs of DSC of BADCY/DCPDBz dopants in different proportions according to an embodiment of the present invention. As shown in FIG. 3, pure BADCY and DCPDBz exothermic peaks fall within a range of high temperatures, and exothermic peaks of both their dopants shift forward significantly, indicating that both DCPDBz oligomer and bisphenol-A dicyanate (BADCY) are subjected to catalysis and thus their exothermic peaks shift forward to fall within a range of low temperatures, wherein cyanate ester reacts quickly enough to reduce residual OCN groups, thereby facilitating the production of copolymers with a low dielectric constant.

Figure 4:
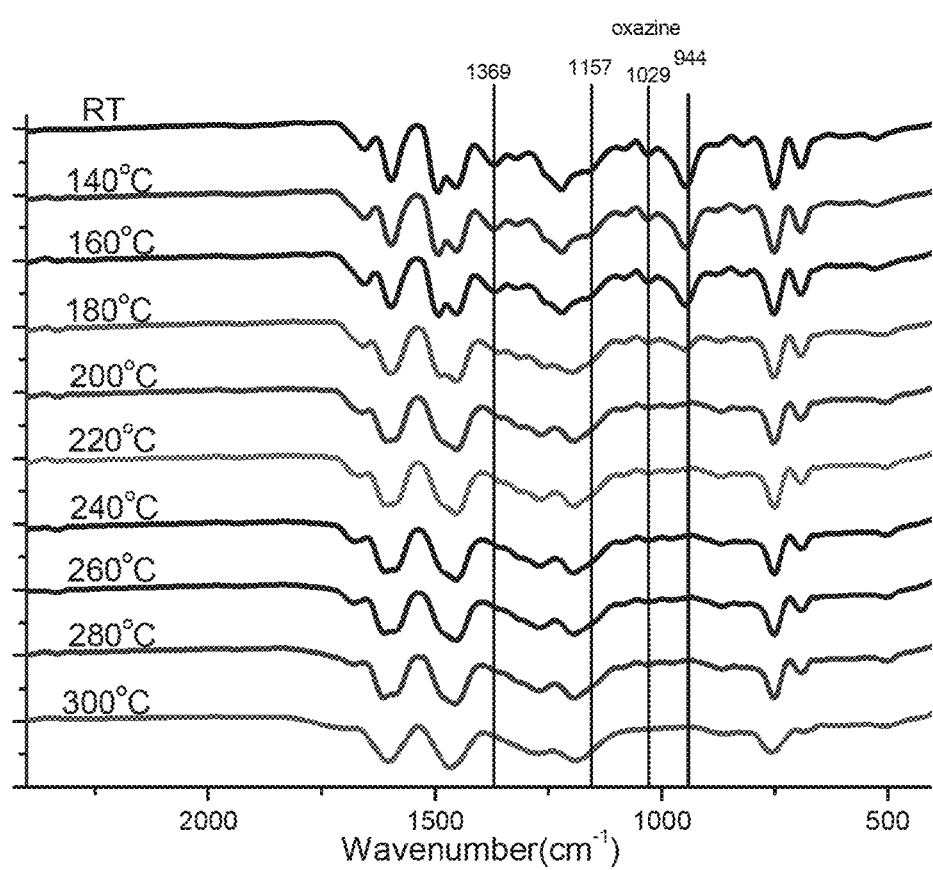
FIG. 4 is a FT-IR spectrum of DCPDBz at different temperatures and for 20 minutes according to an embodiment of the present invention.
Figure 5:
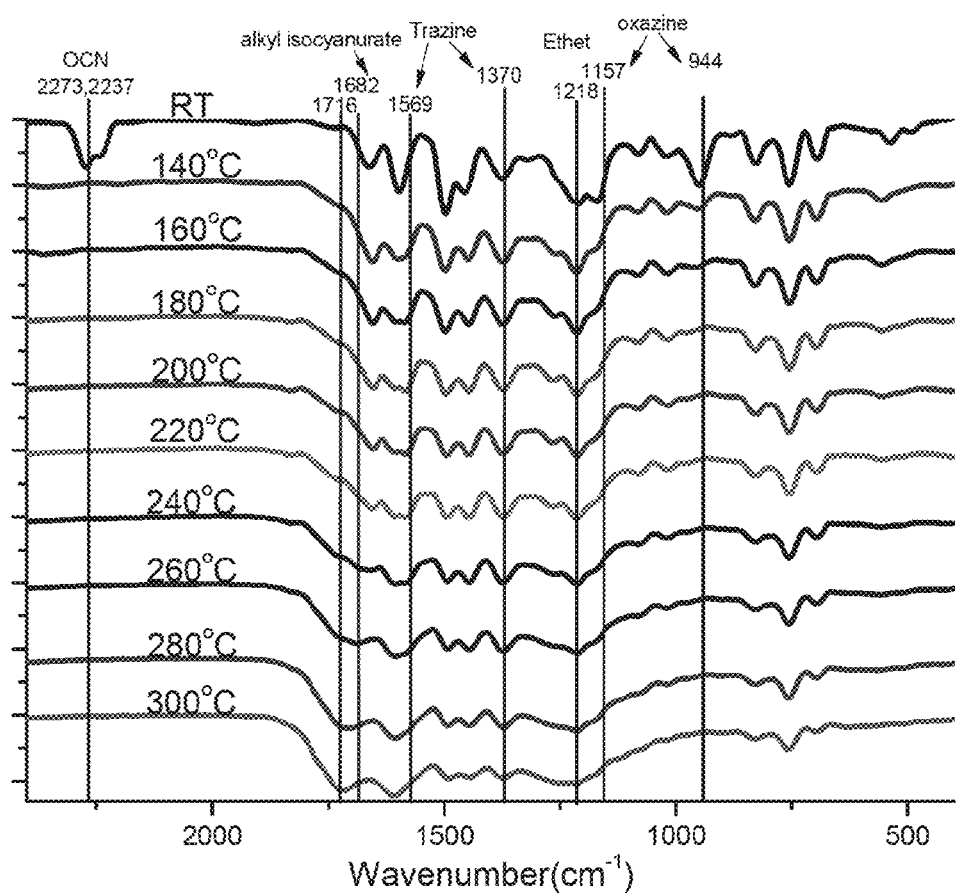
FIG. 5 is a FT-IR spectrum of BADCY/DCPDBz dopants in different proportions, at different temperatures, and for 20 minutes according to an embodiment of the present invention.
Figure 6:
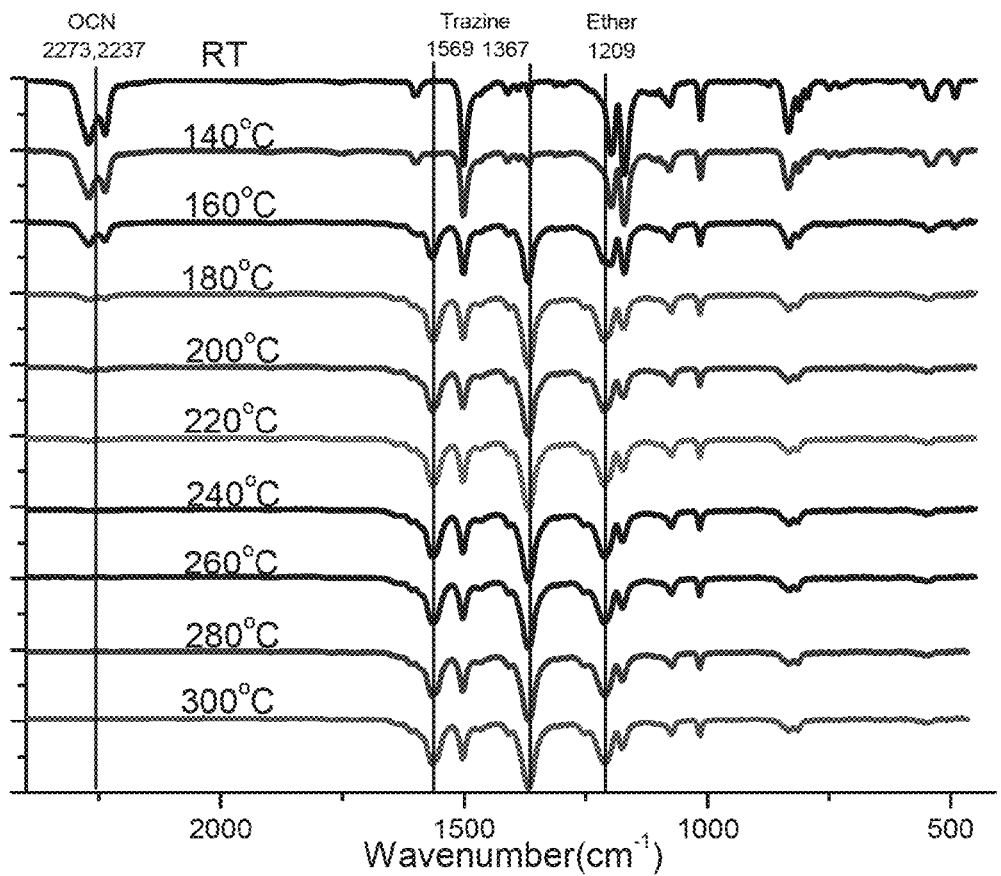
FIG. 6 is a FT-IR spectrum of BADCY at different temperatures and for 20 minutes according to an embodiment of the present invention.

Referring to FIG. 4, FIG. 5, and FIG. 6, there are shown FT-IR spectra of DCPDBz, DCPDBz/BADCY dopants in the proportion of 50/50, and BADCY at different temperatures and for 20 minutes. As shown in FIG. 4, the DCPDBz temperature-variable FT-IR shows that oxazine feature peak 944 cm-1 is gone at 200° C. As shown in FIG. 6, the BADCY cyanate ester group (OCN) feature peak (2273 cm-1 and 2237 cm-1) is gone at 220° C. FIG. 5 shows that 50/50 dopant oxazine feature peak (944 cm-1) has dwindled greatly by 140° C. and is gone at 200° C., and shows that cyanate ester group (—OCN) 2273 cm-1 and 2237 cm-1 feature peaks are gone at 160° C., indicating that benzoxazine and cyanate ester have a catalytic effect on each other—a phenomenon which conforms with the data pertaining to DSC exothermic peaks.

Referring to FIG. 6, the BADCY spectrum shows that Trazine (1367 cm-1 and 1569 cm-1) feature peaks grow with temperature gradually and remain intact at 300° C. Referring to FIG. 5, 50/50 dopant Trazine 1370 cm-1 and 1569 cm-1 absorption peaks increase with temperature, with a surge followed by a diminution, indicating the participation of Trazine structure in the reaction. At last, 1682 cm-1 alkyl isocyanurate is gradually produced.

As observed by DSC and FTIR, the reaction mechanisms of the present invention are as follows:

(1) cyanate ester is subjected to phenolic catalysis to thereby speed up the formation of the triazine three-dimensional reticular structure expressed by Formula 2 below:

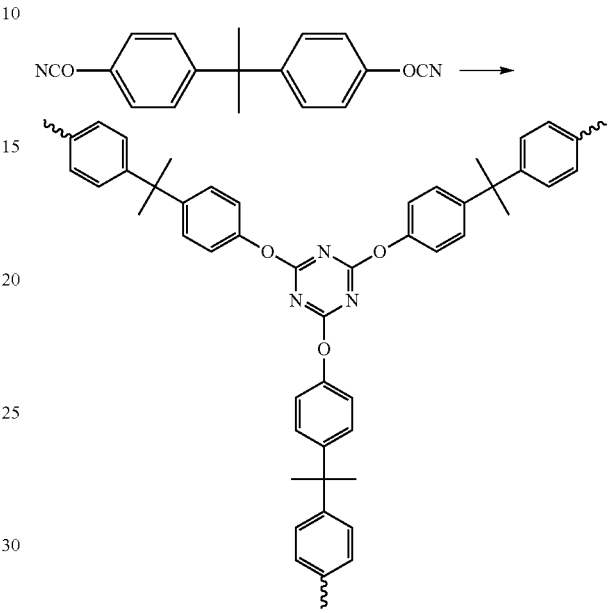

Formula 2

(2) the electron-donating triazine attacks the electron-withdrawing methylene group of oxazine, and then the electron-donating oxygen atom attacks the electron-withdrawing carbon atom, thereby producing alkyl isocyanurate and diphenyl ester structure, which are expressed by Formula 3 below.

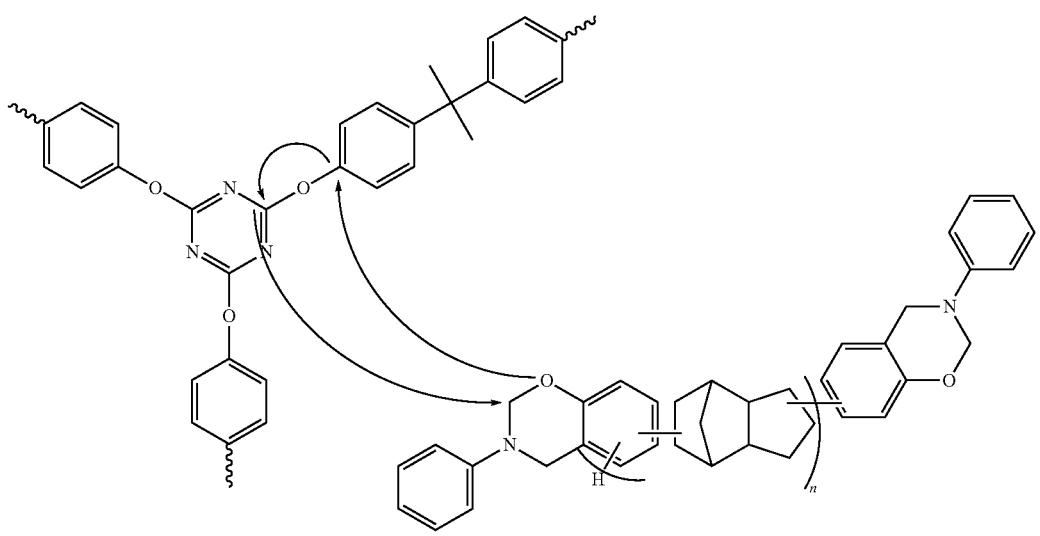

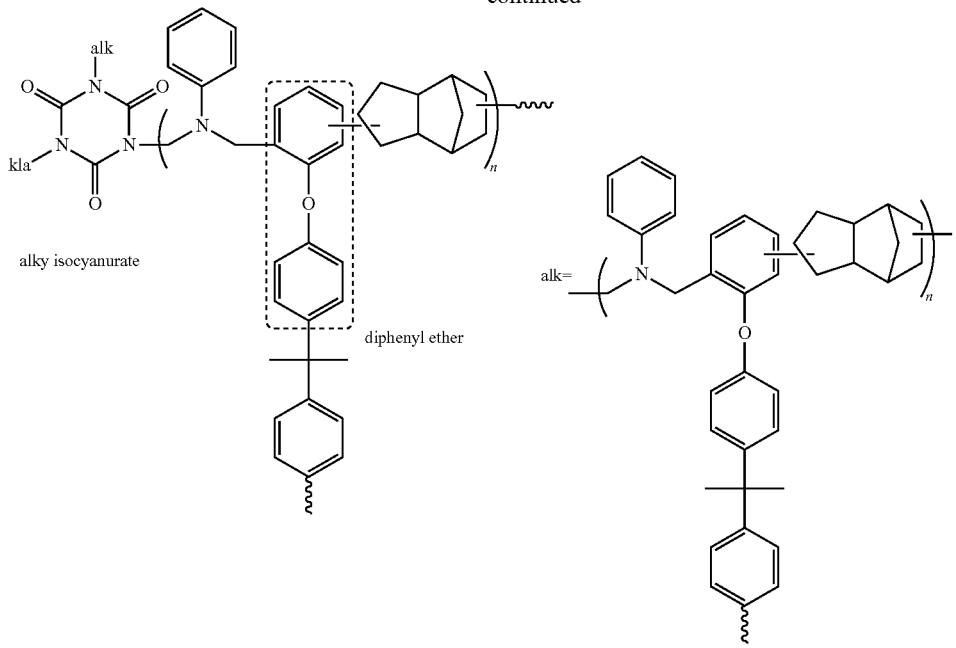

Formula 3

Analysis of Thermal Properties of Copolymer

Figure 7:
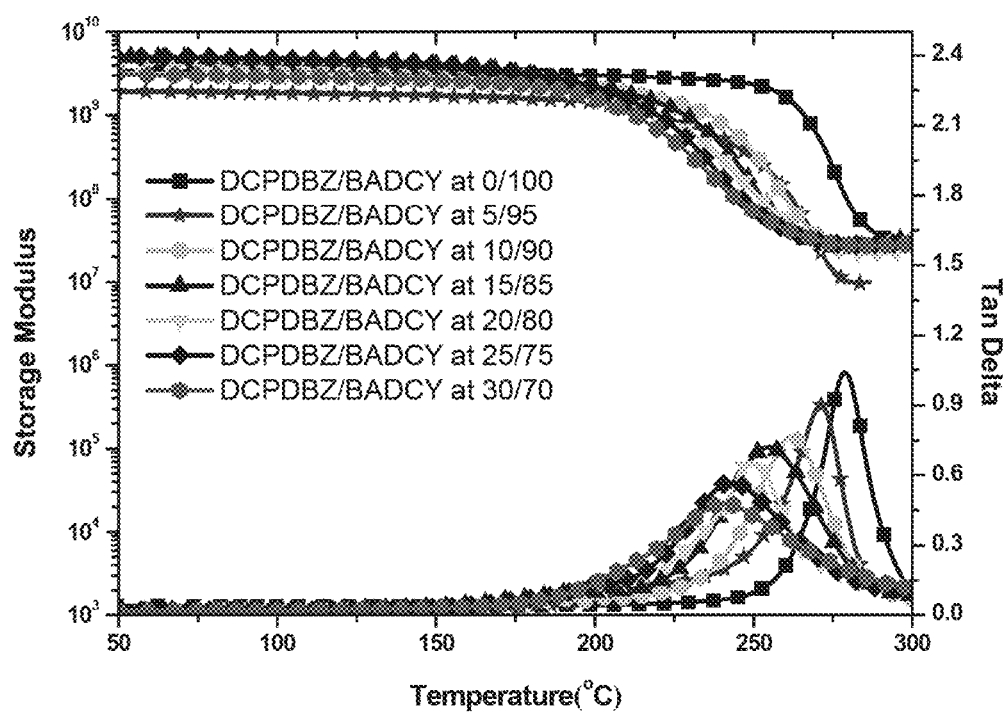
FIG. 7 are graphs of DMA of BADCY/DCPDBz copolymer in different proportions according to an embodiment of the present invention.

Referring to FIG. 7, there are shown graphs of DMA of DCPDBz/BADCY copolymer in different proportions. As shown in the diagram, the copolymer exhibits a single glass transition temperature, thereby indicating that BADCY and DCPDBz react with each other to form a single phase and thus conforming with the prediction of FT-IR spectrum.

Dielectric Properties of Copolymer

Referring to Table 2 below, which shows the dielectric properties of BADCY/DCPDBz copolymer in different proportions, wherein the shown data reveals that adding a small amount of DCPDBz brings about a great decrease in the dielectric constant for the following reasons:

1. Benzoxazine speeds up the reaction of cyanate ester by catalysis and thus reduces the amount of residual terminal groups;
2. DCPDBz contains a hydrophobic DCPD with a cyclic aliphatic structure and thus exhibits very low polarity and tremendous three-dimensional hindrance, and in consequence the cured substance demonstrates a decrease in polarity in whole;
3. The ring opening process of Benzoxazine causes a decrease in the amount of highly polarized phenolic groups; and
4. The diphenyl ether produced during the reaction reduces the dielectric constant.

In addition, dielectric constant increases as the amount of the introduced DCPDBz decreases. Conversely, the amount of the introduced DCPDBz can be increased so as to decrease the dielectric constant, thereby indicating that the present invention is effective in reducing the dielectric constant.

TABLE 2 dielectric properties of DCPDBz/BADCY copolymer in different proportions

| DCPDBz/ | 1 GHz | | 100 MHz | |
|---|---|---|---|---|
| BADCY | Dk(U) a | Df(mU) b | Dk(U) | Df(mU) |
| 0/100 | 3.14 ± 0.005 | 7.89 ± 0.05 | 3.18 ± 0.004 | 7.24 ± 0.6 |
| 5/95 | 2.84 ± 0.006 | 6.89 ± 0.07 | 2.88 ± 0.006 | 6.78 ± 0.3 |
| 10/90 | 2.79 ± 0.008 | 6.76 ± 0.08 | 2.84 ± 0.008 | 6.83 ± 0.4 |
| 15/85 | 2.73 ± 0.008 | 6.70 ± 0.09 | 2.78 ± 0.008 | 6.38 ± 0.6 |
| 20/80 | 2.70 ± 0.008 | 6.69 ± 0.09 | 2.75 ± 0.009 | 6.47 ± 0.6 |
| 25/75 | 2.64 ± 0.008 | 6.66 ± 0.09 | 2.67 ± 0.009 | 6.35 ± 0.6 |
| 30/70 | 2.61 ± 0.009 | 6.51 ± 0.09 | 2.63 ± 0.009 | 6.26 ± 0.6 | a: dielectric constant measured at 25° C., 1 GHz, and 0.1 GHz
b: dielectric loss measured at 25° C., 1 GHz, and 0.1 GHz Accordingly, the present invention discloses a copolymer of DCPDBz and cyanate ester and a method of manufacturing the copolymer, thereby providing a novel material characterized by a low dielectric constant and adapted for use as a raw material for making a substrate carrying electronic components.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and changes made by persons skilled in the art to the aforesaid embodiments without departing from the spirit and scope of the present invention should fall within the scope of the present invention. Accordingly, the legal protection for the present invention should be defined by the appended claims.

What is claimed is:

1. A method of manufacturing a copolymer of DCPD-containing benzoxazine (DCPDBz) and cyanate ester resin, the method comprising the steps of: providing DCPD-phenol oligomer, aniline, and paraformaldehyde in a first solvent to form a first solution, allowing the first solution to undergo a reaction at 110° C. for 6-12 hours, extracting and baking the first solution, precipitating and rinsing a product with a second solvent, drying the precipitated rinsed product in a vacuum oven to obtain DCPDBz, mixing a cyanate ester and the DCPDBz at 150° C., and heating the mixture up to 220° C. to produce the copolymer of the thermosetting polymeric DCPDBz and cyanate ester resin.

2. The method of claim 1, wherein the first solvent is toluene.

3. The method of claim 1, wherein the second solvent is hexane.

4. The method of claim 1, wherein the extraction process is carried out with a sodium hydroxide (NaOH) solution and water each for many times.

5. The method of claim 4, wherein the sodium hydroxide (NaOH) solution has a concentration of 1M.

6. The method of claim 4, wherein the water is deionized water.

7. The method of claim 6, wherein the temperature rises to 180° C., 200° C., and 220° C. successively at intervals of 2 hours.

\* \* \* \* \*